(12) United States Patent
Kosugi et al.

(10) Patent No.: US 11,066,013 B2
(45) Date of Patent: Jul. 20, 2021

(54) VIEWING DEVICE FOR VEHICLE

(71) Applicant: KABUSHIKI KAISHA TOKAI-RIKA-DENKI-SEISAKUSHO, Aichi (JP)

(72) Inventors: Masanori Kosugi, Aichi (JP); Takashi Nagao, Aichi (JP); Tetsuya Egawa, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 0 days.

(21) Appl. No.: 16/969,908

(22) PCT Filed: Feb. 8, 2019

(86) PCT No.: PCT/JP2019/004619
§ 371 (c)(1),
(2) Date: Aug. 13, 2020

(87) PCT Pub. No.: WO2019/163563
PCT Pub. Date: Aug. 29, 2019

(65) Prior Publication Data
US 2021/0009036 A1     Jan. 14, 2021

(30) Foreign Application Priority Data

Feb. 20, 2018    (JP) .............................. JP2018-027763

(51) Int. Cl.
| B60R 1/00 | (2006.01) |
| H04N 5/262 | (2006.01) |
| H04N 5/265 | (2006.01) |
| H04N 7/18 | (2006.01) |

(52) U.S. Cl.
CPC .............. *B60R 1/00* (2013.01); *H04N 5/265* (2013.01); *H04N 5/2628* (2013.01); *H04N 7/183* (2013.01); *B60R 2300/105* (2013.01); *B60R 2300/202* (2013.01); *B60R 2300/802* (2013.01)

(58) Field of Classification Search
None
See application file for complete search history.

(56) References Cited

U.S. PATENT DOCUMENTS

| 2008/0151048 A1* | 6/2008 | Watanabe ................. B60R 1/00 348/143 |
| 2009/0079585 A1 | 3/2009 | Chinomi et al. |
| 2018/0272948 A1* | 9/2018 | Kumon ..................... B60R 1/12 |
| 2018/0304813 A1* | 10/2018 | Seki ........................ H04N 7/181 |

FOREIGN PATENT DOCUMENTS

| JP | 2004-194169 A | 7/2004 |
| JP | 2009-081664 A | 4/2009 |
| JP | 2009-101954 A | 5/2009 |
| JP | 2010-095086 A | 4/2010 |
| JP | 2012-170127 A | 9/2012 |

* cited by examiner

*Primary Examiner* — Rebecca A Volentine
(74) *Attorney, Agent, or Firm* — Roberts Calderon Safran & Cole P.C.

(57) ABSTRACT

A viewing device for a vehicle has: a monitor that displays a captured image of a vehicle rear side; and a control device that carries out display control that compresses the captured image such that a compression rate gradually becomes higher from a vehicle inner side toward outer sides, and displays an image on the monitor.

5 Claims, 6 Drawing Sheets

VEHICLE TRANSVERSE DIRECTION

VIEWING DEVICE FOR VEHICLE

CROSS-REFERENCE TO RELATED APPLICATIONS

The present application is a U.S. National Phase of PCT/JP2019/004619 filed on Feb. 8, 2019, claiming priority under 35 USC 119 from Japanese Patent Application No. 2018-027763 filed Feb. 20, 2018, the disclosure of which is incorporated by reference herein.

TECHNICAL FIELD

The present invention relates to a viewing device for a vehicle by which the periphery of a vehicle is viewed due to the viewing device for a vehicle capturing images of the periphery of the vehicle and displaying the captured images.

BACKGROUND ART

There is known a technique of installing a viewing device for a vehicle, which displays captured images of the periphery of a vehicle and by which the periphery of the vehicle is viewed, instead of an optical mirror in a vehicle.

For example, in Japanese Patent Application Laid-Open (JP-A) No. 2009-81664, a rearward image is displayed at an image size that corresponds to the mirror-reflected image of a rearview mirror, on a central display region, which is relatively wide and which is positioned at the lateral direction center, of an image displaying means. Further, an image of the rear right side and an image of the rear left side are displayed, as images that have been compressed more than the rearward image, on outer side display regions that are positioned at the outer sides of the central display region.

Further, at a viewing device for a vehicle that displays captured images, there are cases in which an optical mirror such as a half-mirror or the like is provided at the display surface, or the like, because the rearward visual field cannot be ensured if a situation arises in which an image cannot be displayed on a monitor (e.g., JP-A No. 2014-200018).

SUMMARY OF INVENTION

Technical Problem

By the way, in a viewing device for a vehicle that displays a captured image on a monitor, even if an attempt is made to display more of the vehicle transverse direction, the size of the screen is limited, and there are limits on the image that can be displayed.

Thus, it is thought to more broadly display the range that is displayed, by narrowing the central display region and compressing both.

However, in a case in which it is possible to switch over to an optical mirror as in JP-A No. 2014-200018, when the optical mirror is switched to, the sizes of the displayed image and the reflected image of the optical mirror are different, and there is the possibility that a sense of incongruity will arise. Further, in a structure that does not have an optical mirror, it is desirable to display an image that is the same as an image reflected in an optical mirror.

The present invention was made in view of the above-described circumstances, and an object thereof is to provide a viewing device for a vehicle that can display a wider range while displaying an image that is the same as an image reflected in an optical mirror.

Solution to Problem

In order to achieve the above-described object, a first aspect has: a display portion that displays a captured image of a vehicle rear side; and a control section that carries out display control that compresses the captured image such that a compression rate in a vehicle transverse direction gradually increases from a vehicle inner side toward vehicle outer sides, and displays an image on the display portion.

In accordance with the first aspect, because a captured image of the vehicle rear side is displayed at the display portion, the vehicle rear side can be viewed by using the captured image that is displayed.

Further, at the control section, display control is carried out in which the captured image is compressed such that the compression rate in the vehicle transverse direction gradually increases from the vehicle inner side toward the vehicle outer sides, and the image is displayed on the display portion. Generally, an object that is projected in the reflected image of an optical mirror appears to become smaller toward the vehicle sides. Accordingly, due to the control section carrying out compression such that the compression rate in the vehicle transverse direction gradually becomes higher from the vehicle inner side toward the vehicle outer sides, a broader range can be displayed while displaying an image that is the same as an image that is reflected in an optical mirror.

A second aspect has: a display portion that displays a captured image of a vehicle rear side; and a control section that carries out display control that compresses, in a vehicle transverse direction, regions that are further toward sides than a region corresponding to a rear glass in the captured image, and displays an image on the display portion.

In accordance with the second aspect, because a captured image of the vehicle rear side is displayed at the display portion, the vehicle rear side can be viewed by using the captured image that is displayed.

Further, at the control section, display control is carried out such that regions that are further toward the sides than the region that corresponds to the rear glass in the captured image are compressed in the vehicle transverse direction, and the image is displayed on the display portion. In this way, by not compressing the region that corresponds to the rear glass and compressing the regions that are further toward the sides than that region, the similarity relation with respect to the vertical and horizontal scale is maintained at the region corresponding to the rear glass, and therefore, an image that is the same as an image that is reflected in an optical mirror can be displayed. Further, because the regions that are further toward the sides than the rear glass are compressed, a wider range can be displayed. Accordingly, a broader range can be displayed while displaying an image that is the same as an image that is reflected in an optical mirror.

Note that the regions at the sides that are compressed may be regions that are further toward the sides than rear pillars that are adjacent to the rear glass. Due thereto, because the regions that correspond to the rear pillars also are not compressed, the region, in which a sense of incongruity at the time of switching to the optical mirror is suppressed, can be widened.

Further, the display control in the second aspect may compress the regions at the sides that are compressed, such that a compression rate gradually increases from a vehicle inner side toward outer sides. In this case, the display control may carry out compression by gradually increasing the compression rate from the vehicle inner side toward the outer sides in accordance with a ratio of actual apparent sizes.

The display control in the first aspect may compress the captured image by gradually increasing the compression rate from the vehicle inner side toward the outer sides in accordance with a ratio of actual apparent sizes, and may display an image on the display portion.

Note that, given that a distance from a front in the captured image to a side of an object is L, a distance to a virtual screen that is used at a time of generating a captured image to be displayed on the display portion is d, and a size of the object in the vehicle transverse direction is a, the display control may carry out compression so as to satisfy formula $\theta = \arctan((a/d)/(1+L\times(L+a)/d^2))$, and may display an image on the display portion.

Advantageous Effects of Invention

As described above, in accordance with the present invention, there is the effect that a viewing device for a vehicle can be provided that can display a wider range while suppressing a sense of incongruity at the time of switching to an optical mirror.

DESCRIPTION OF EMBODIMENTS

Figure 1A:
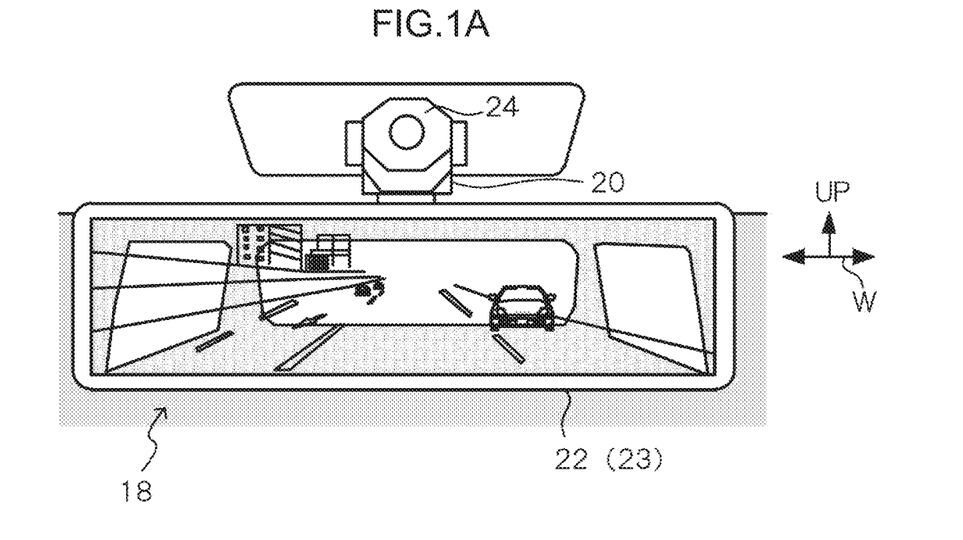
FIG. 1A is a front view in which main portions within a cabin of a vehicle are seen from a vehicle rear side.
Figure 1B:
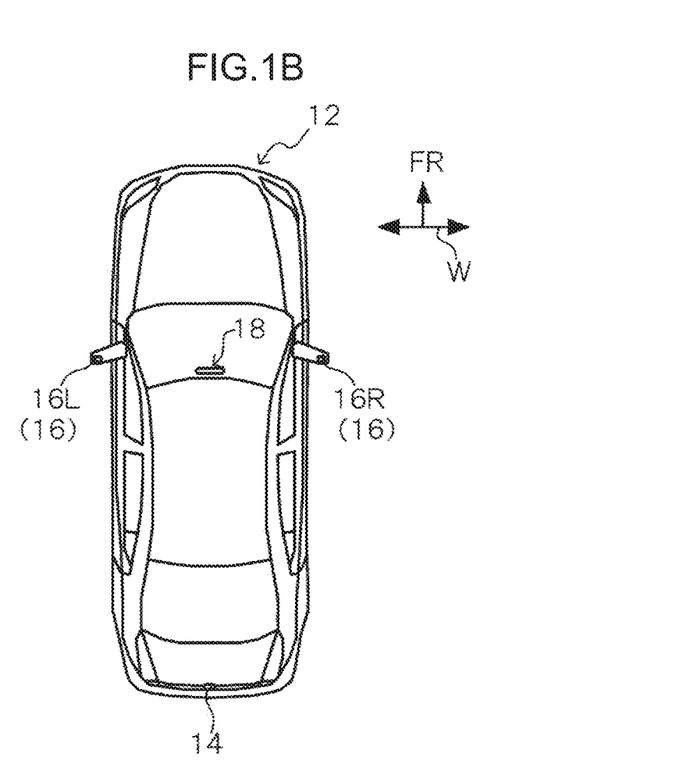
FIG. 1B is a plan view that is seen from above and shows a vehicle at which a viewing device for a vehicle is provided.
Figure 2:
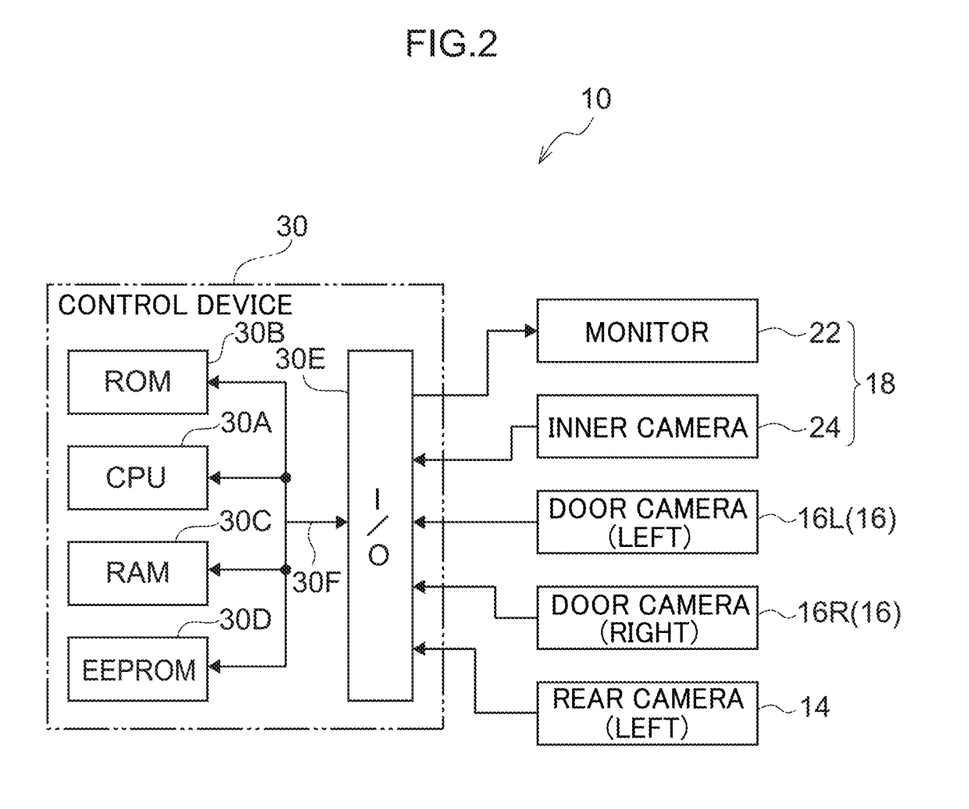
FIG. 2 is a block drawing showing the schematic structure of the viewing device for a vehicle relating to the present embodiment.

Embodiments of the present invention are described in detail hereinafter with reference to the drawings. FIG. 1A is a front view in which main portions of a cabin interior of a vehicle 12 are seen from a vehicle rear side, and FIG. 1B is a plan view that is seen from above and shows the vehicle 12 at which a viewing device 10 for a vehicle is provided. Further, FIG. 2 is a block drawing showing the schematic structure of the viewing device 10 for a vehicle relating to the present embodiment. Note that, in the respective drawings, arrow FR indicates the vehicle front side, arrow W indicates the vehicle transverse direction, and arrow UP indicates the vehicle upper side.

A rear camera 14 and door cameras 16 (16L, 16R) are provided at the viewing device 10 for a vehicle. The rear camera 14 is disposed at the vehicle rear portion such as the trunk or like for example, and can capture images of the rear side of the vehicle 12 at a predetermined angle of view (imaging region). Further, the door camera 16L is provided at the vehicle transverse direction left end portion of the vehicle 12, and the door camera 16R is provided at the vehicle transverse direction right end portion of the vehicle 12. The door cameras 16L, 16R can capture images of the vehicle rear side from the vehicle body sides at predetermined angles of view (imaging regions).

The rear camera 14 and the door cameras 16L, 16R capture images of the vehicle rear side that serves as the vehicle periphery. In detail, portions of the imaging region of the rear camera 14 overlap portions of the imaging regions of the door cameras 16L, 16R, and the vehicle rear side can be imaged over a range from the obliquely rear right to the obliquely rear left of the vehicle body. Due thereto, the rear side of the vehicle 12 can be imaged over a wide angle.

An inner mirror 18 is provided within the cabin of the vehicle 12. At the inner mirror 18, the base portion of a bracket 20 is mounted to the vehicle front side and the vehicle transverse direction central portion of the ceiling surface within the cabin. A monitor 22, which serves as a display portion and is shaped as an elongated rectangle, is provided at the bracket 20. The monitor 22 is mounted to the lower end portion of the bracket 20 with the length direction of the monitor 22 being the vehicle transverse direction and the display surface of the monitor 22 being directed toward the vehicle rear side. Due thereto, the monitor 22 is disposed in a vicinity of the upper portion of the front windshield glass that is at the vehicle front side, and the display surface that displays images can be seen by the vehicle occupants who are within the cabin.

A half-mirror (wide mirror) 23 is provided at the display surface of the monitor 22. When the monitor 22 is not displaying, the rearward visual field through the cabin interior as well as the rear glass and the door glasses is projected in the half-mirror 23. Note that the half-mirror 23 may be omitted.

An inner camera 24 is provided at the bracket 20. The inner camera 24 is fixed to the bracket 20 at the upper side (the cabin interior ceiling side) of the monitor 22. The imaging direction of the inner camera 24 is directed toward the vehicle rear side, and the inner camera 24 captures images of the cabin interior and the vehicle rear side from the vehicle front side.

The rear glass and the door glasses of the side doors are included in the imaging region of the inner camera 24. Imaging of the imaging regions of the rear camera 14 and the door cameras 16L, 16R is possible through the rear glass and the door glasses. Further, the center pillars, the rear pillars, the rear side doors, the rear seats, the cabin interior ceiling and the like that can be seen within the cabin are included in the imaging region of the inner camera 24. Note that the front seats may also be included in the imaging region of the inner camera 24.

On the other hand, a control device 30 that serves as a control section is provided at the viewing device 10 for a vehicle. The rear camera 14, the door cameras 16L, 16R, the monitor 22 and the inner camera 24 are connected to the control device 30. A microcomputer, at which a CPU 30A, a ROM 30B, a RAM 30C, a non-volatile storage medium (e.g., an EEPROM) 30D and an I/O (input/output interface) 30E are respectively connected to a bus 30F, is included in the control device 30. Various programs, such as a viewing/displaying control program for a vehicle and the like, are stored in the ROM 30B and the like. The control device 30 displays an image, which assists viewing by the vehicle occupant, on the monitor 22 due to the CPU 30A reading-out and executing programs that are stored in the ROM 30B or the like.

The control device 30 generates a vehicle exterior image by overlapping the captured images of the vehicle exterior that are captured by the rear camera 14 and the door cameras 16L, 16R, respectively. Further, the control device 30 generates a vehicle cabin image from the captured image that is captured by the inner camera 24. Moreover, the control device 30 generates an image for display by superposing the vehicle exterior image and the vehicle cabin image, and effects control so as to display the image for display on the monitor 22. Note that the monitor 22 is provided further toward the vehicle front side than the driver's seat, and the image that is displayed on the monitor 22 is reversed left and right with respect to the captured image. Further, hereinafter, there are cases in which the description omits the mirror image converting processing that reverses the image left and right.

Here, the viewpoint positions of the captured images are different at the rear camera 14, the door cameras 16L, 16R and the inner camera 24, respectively. Thus, the control device 30 carries out viewpoint converting processing, which causes the viewpoint positions to match, on the respective captured images of the rear camera 14, the door cameras 16L, 16R and the inner camera 24. In this viewpoint converting processing, for example, a virtual viewpoint is set further toward the vehicle front side than the central position of the monitor 22 (an intermediate position in the vehicle transverse direction and the vertical direction), and the respective captured images of the rear camera 14, the door cameras 16L, 16R and the inner camera 24 are converted into images that are seen from the virtual viewpoint. When carrying out the viewpoint converting processing, a virtual screen is set at the vehicle rear side together with the virtual viewpoint. In the present embodiment, the virtual screen is described as being planar in order to simplify explanation, but may be a curved surface that is convex toward the vehicle rear side (a curved surface that is concave as seen from the vehicle 12). An arbitrary method, which converts the respective captured images into images that are seen from the virtual viewpoint and are projected onto the virtual screen, is used as the viewpoint converting processing.

Due to viewpoint converting processing being carried out by using the same virtual viewpoint and the virtual screen, the respective captured images appear as if a same object that is reflected in the different captured images is superposed. Namely, supposing that objects, which are projected through the rear glass and the door glasses in the captured image of the inner camera 24, are reflected in the captured images of the rear camera 14 and the door cameras 16L, 16R, it appears as if the images of these objects are superposed. The control device 30 carries out trimming processing on the respective captured images of the rear camera 14, the door camera 16L and the door camera 16R that have been subjected to the viewpoint converting processing, and extracts an image of a region to be displayed on the monitor 22.

By carrying out trimming processing on the captured image of the inner camera 24, the control device 30 extracts an image of a region that is to be displayed as the vehicle cabin image on the monitor 22. Further, at the control device 30, a transmittance rate is set for the vehicle cabin image, and image conversion is carried out such that the vehicle cabin image becomes the set transmittance rate. Due to the transmittance rate of the vehicle cabin image being increased, the transparency increases and the transmissiveness improves, and the image becomes lighter (appears to be more faint) as compared with a case in which the transmittance rate is low. A transmittance rate, at which the vehicle exterior image can be recognized in the combined image, is set as the transmittance rate that is set for the vehicle cabin image. Further, at the control device 30, the transmittance rate for the vehicle cabin image is set to be lower (is set such that the image appears to be more intense) at the images of the rear pillars, the upper side portions of the rear pillars in the images of the cabin ceiling, and the lower side portions of the rear pillars in the images of the rear seats, than the images of the other vehicle body portions.

Note that the transmittance rate of the images of the rear glass and the door glasses may be 100% (full transmission), or may be a transmittance rate that is similar to that of the images of the vehicle body portions other than the rear pillars. Further, in the present embodiment, in addition to the rear pillars, the images of the ceiling within the cabin at the upper side portions of the rear pillars, and the images of the rear side doors and the rear seats at the lower side portions of the rear pillars, are included as images of vehicle body parts for which the transmittance rate is set to be low.

By the way, in the viewing device 10 for a vehicle relating to the present embodiment, the half-mirror 23 is provided at the display surface of the monitor 22, and switching between a rearward visual field that is reflected in the half-mirror 23 and a rearward visual field that is displayed by the monitor 22 is possible. Further, depending on the way of displaying, the captured image that is displayed on the monitor 22 can display a region of a wider range than the range of the rearward visual field that is reflected in the half-mirror 23. Therefore, there is the need to suppress a sense of incongruity in a case in which the rearward visual field is switched. Further, in a structure in which the half-mirror 23 is not provided, it is desirable to display an image that is the same as an image reflected in an optical mirror such as the half-mirror 23 or the like.

Thus, in the present embodiment that is described hereinafter, there is described a method of making the range of the rearward visual field that is displayed on the monitor 22 be a wider range, while displaying an image that is the same as an image that is reflected in an optical mirror.

First Embodiment

In the present embodiment, as described above, the vehicle exterior image is generated by combining the captured images of the three cameras. At this time, if the angles of view of the left and right door cameras 16 are made to be large or the cameras themselves are directed toward the outer sides, more of the sides of the vehicle are imaged. Because the image that is displayed on the monitor 22 is limited to the size of the display screen, unless some type of measure is taken, not all of the captured image can be displayed on the monitor 22, or the entire image will be displayed small.

On the other hand, in the unlikely event of switching the display to the half-mirror 23 that is an optical mirror, it is desirable to make the appearance of the image that is displayed on the monitor 22 be the same as much as possible. Namely, at the time of displaying an image on the monitor 22, it is not preferable for non-linear compression to be carried out on the captured image or for the image to be displayed exceedingly small.

Thus, in the present embodiment, display control is carried out so as to display the image such that, in order to make the region, which corresponds to the rear glass and can be seen in the half-mirror 23, be the same as it appears in the half-mirror 23, this region is scaled in the vehicle vertical direction and the vehicle transverse direction so as to have a similarity relation, and the regions that are further toward the sides than the rear glass are compressed in the vehicle transverse direction. Due thereto, at the rear glass portion, an image which is the same as the image reflected in the half-mirror 23 is displayed, and a sense of incongruity can be suppressed even when switching to the half-mirror 23. Further, because the regions that are further toward the sides than the rear glass are compressed in the vehicle transverse direction, more of the captured image can be displayed.

Figure 3A:
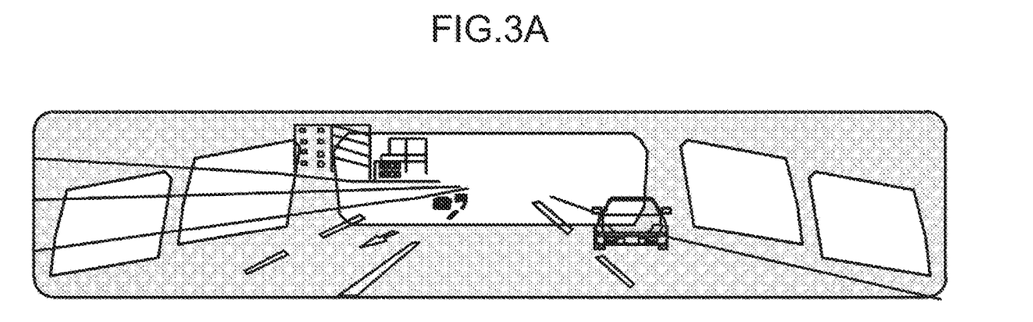
FIG. 3A is a drawing showing an example of an image for display that is generated by combining captured images, which have been captured by three cameras that are left and right door cameras and a rear camera provided in a vicinity of a trunk, and further combining that combined image with a vehicle cabin interior image.

FIG. 3A shows an example of an image for display that is generated by combining the captured images that are captured by the three cameras that are the left and right door cameras 16L, 16R and the rear camera 14 that is provided in the vicinity of the trunk, and further combining this combined image with the vehicle cabin interior image. Note that FIG. 3A shows an example in which the vehicle cabin image is see-through superposingly displayed such that it is possible to see-through the respective glasses that are the rear glass, the rear seat side glasses and the front seat side glasses.

Figure 3B:
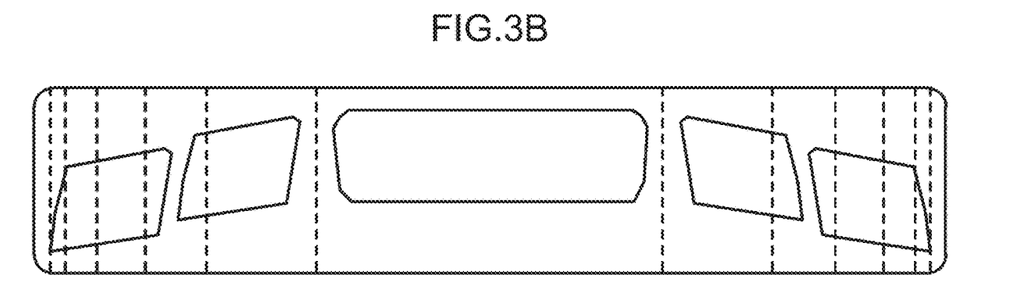
FIG. 3B is a drawing for explaining compression of regions that correspond to further toward the sides than a rear glass in the captured image.

Because the combined image will not be able to be completely displayed on the monitor 22 merely by combining the three captured images as in FIG. 3A, in the present embodiment, as shown in FIG. 3B, the regions that correspond to further toward the sides than the rear glass in the captured images are compressed. The compression of the images that are further toward the sides than the rear glass may be the compressing of the regions further toward the sides than the rear glass at a predetermined compression rate. Or, as shown by the dotted lines in FIG. 3B, the images may be divided into regions such that, the further toward the sides, the more narrow the divisional regions become, and compression of the respective regions may be carried out such that, the further toward the sides, the greater the compression rate becomes in a stepwise manner. Or, linear compression may be carried out such that, the further toward the sides, the higher the compression rate becomes, as in the case of a reflected image of an aspherical mirror.

Figure 4:
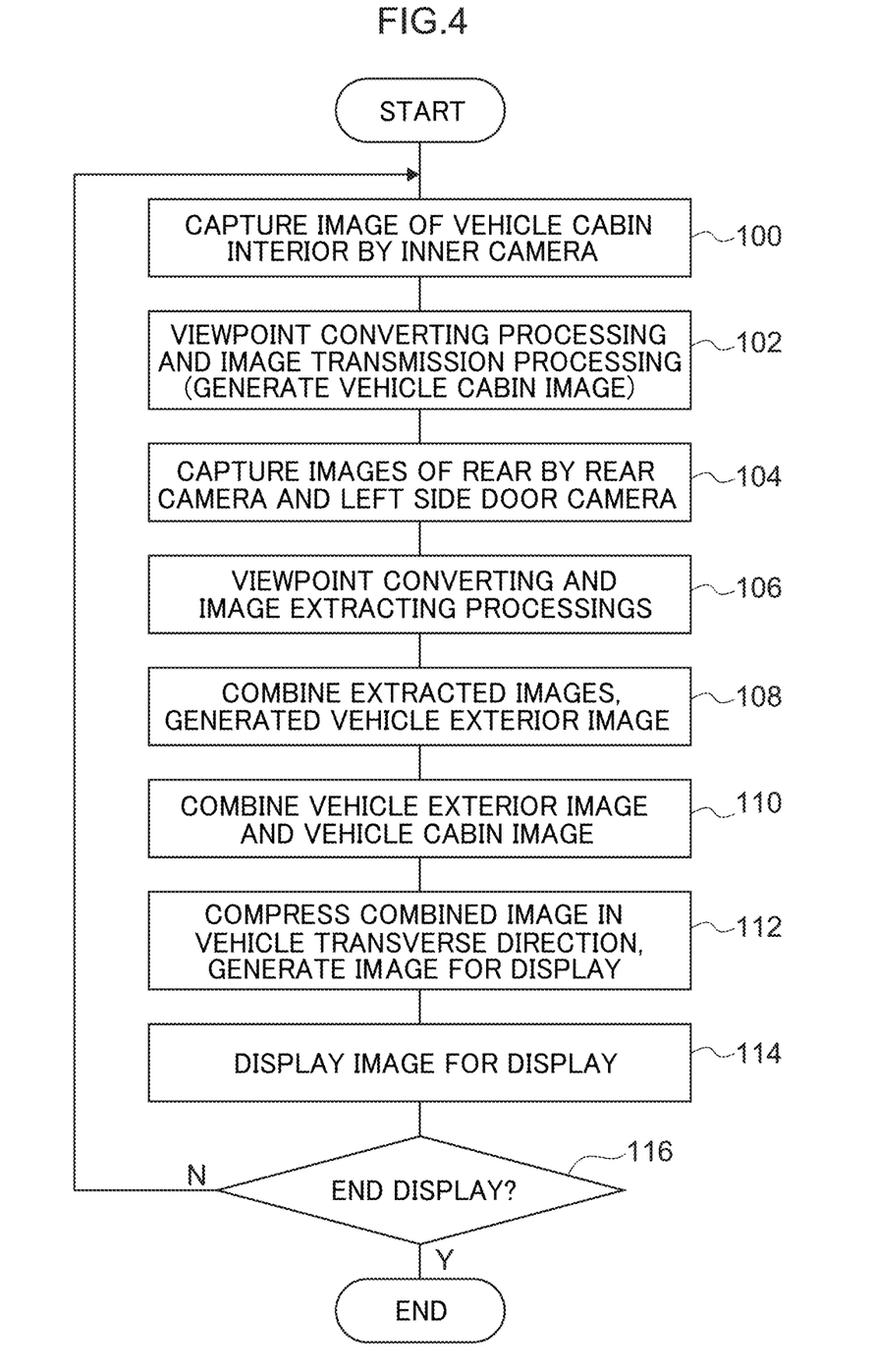
FIG. 4 is a flowchart showing an example of the flow of processing at the time of displaying an image on a monitor, which processing is carried out by a control device of the viewing device for a vehicle relating to the present embodiment.

Concrete processings carried out at the control device 30 of the viewing device 10 for a vehicle relating to the present embodiment are described next. FIG. 4 is a flowchart showing an example of the flow of processing at the time when an image is displayed on the monitor 22, which processing is carried out at the control device 30 of the viewing device 10 for a vehicle relating to the present embodiment. Note that the processing of FIG. 4 is carried out due to the viewing/display control program for a vehicle being executed, and is started in a case in which an unillustrated ignition switch (IG) is turned on. Or, a switch that switches between displaying or not displaying on the monitor 22 may be provided, and the processing may start in a case in which displaying is instructed. In this case, due to the switch being turned on, image display onto the monitor 22 is started. Due to the switch being turned off, the image display onto the monitor 22 is ended, and the monitor 22 functions as a rearview mirror (the half-mirror 23).

In step 100, due to the CPU 30A carrying out imaging of the cabin interior by the inner camera 24, the captured image of the cabin interior is read-in, and the CPU 30A moves on to step 102.

In step 102, the CPU 30A carries out viewpoint converting processing (including trimming processing) on the captured image of the cabin interior, and converts the image to a preset transmittance rate and generates the vehicle cabin image, and moves on to step 104.

In step 104, due to the CPU 30A carrying out imaging by the rear camera 14 and the door cameras 16L, 16R respectively, the captured images of the vehicle exterior are read-in, and the CPU 30A moves on to step 106.

In step 106, the CPU 30A carries out viewpoint converting processing on the captured images of the vehicle exterior, and carries out captured image extracting processing (trimming processing) and the like, and moves on to step 108. Namely, the CPU 30A carries out viewpoint conversing processing on the respective captured images, and extracts images, which are for generating the vehicle exterior image, from the respective captured images of the rear camera 14 and the door cameras 16L, 16R.

In step 108, the CPU 30A combines the images, which were extracted by the trimming processing, and generates a vehicle exterior image, and moves on to step 110. Namely, the CPU 30A combines the images, which were extracted from the captured images of the three cameras, and generates the vehicle exterior image.

In step 110, the CPU 30A combines the vehicle exterior image and the vehicle cabin image, and moves on to step 112.

In step 112, the CPU 30A compresses the combined image in the vehicle transverse direction and generates an image for display, and moves on to step 114. In the present embodiment, as described above, the images that are further toward the sides than the rear glass are compressed. Due thereto, at the region that corresponds to the rear glass, an image that is the same as the image reflected in the half-mirror 23 is displayed, and, even if display is switched to the half-mirror 23, a sense of incongruity can be suppressed, and the regions further toward the sides than the rear glass are compressed. Therefore, more of the sides can be displayed.

In step 114, the CPU 30A displays the generated image for display on the monitor 22, and moves on to step 116.

In step 116, the CPU 30A judges whether or not display onto the monitor 22 is finished. This judgment is a judgement as to whether or not the ignition switch has been turned off, or as to whether or not an instruction for non-display has been given at the switch of the monitor 22. If this judgment is negative, the routine returns to step 100 and the above-described processings are repeated. If this judgment is affirmative, the series of display processings is ended.

In this way, in the present embodiment, the region that corresponds to the rear glass is displayed without being compressed in the vehicle transverse direction, and the regions further toward the sides than the rear glass are compressed. Due thereto, while an image that is the same as the image that is reflected in the half-mirror 23 is displayed, more of the image can be displayed, and the rearward visual field can be broadened.

Note that, in the present embodiment, the regions that are further toward the sides than the region corresponding to the rear glass are compressed, but the present invention is not limited to this. For example, regions that are further toward the sides than the rear pillars, which are adjacent to the rear glass, may be compressed, and the regions that are exempt from being objects of compression may be increased more as described above.

Second Embodiment

In the above-described embodiment, the images that are further toward the sides than the portion corresponding to the rear glass are compressed. However, in the present embodiment, compression is carried out such that the compression rate gradually increases from the vehicle inner side toward the outer sides. In further detail, in order to make it possible to naturally recognize a wider range, compression is carried out by varying the compression rate in the vehicle transverse direction such that the compression rate gradually becomes higher from the vehicle inner side toward the outer sides in accordance with the ratio of the sizes of the actual appearances, in the same way as with the actual way of viewing.

Figure 5:
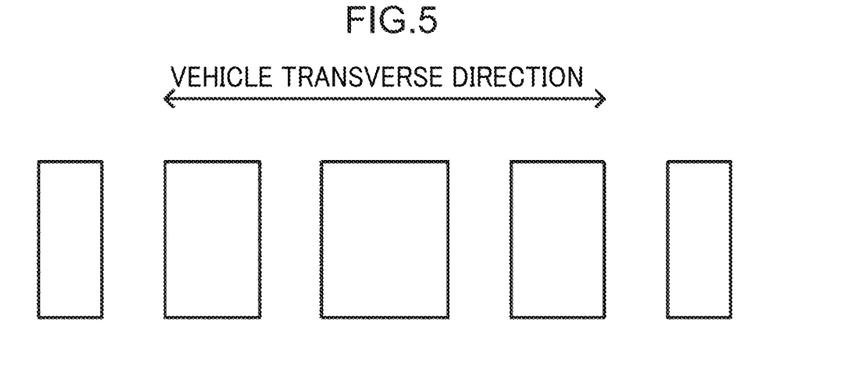
FIG. 5 is a schematic drawing showing an example in which, the further toward the sides, the higher the compression rate in the vehicle transverse direction at which compression is carried out.

For example, the rectangular portions that are shown in FIG. 5 all originally are the same size, but the widths thereof appear to become more narrow toward the left and the right (toward the sides). Therefore, compression is carried out such that, the further toward the sides as shown in FIG. 5, the more the compression rate in the vehicle transverse direction is raised.

Figure 6:
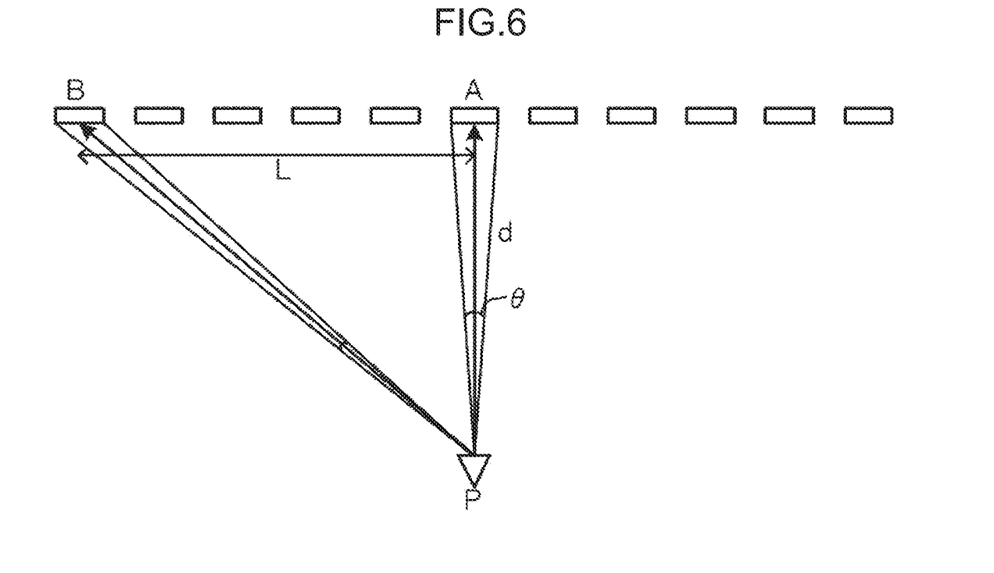
FIG. 6 is a schematic drawing for explaining ways of viewing from an eyepoint.

More detailed explanation is given by using FIG. 6. FIG. 6 is a schematic drawing for explaining ways of viewing from an eyepoint.

In a case in which object A that is directly in front is viewed from eyepoint P, and in a case in which object B, which is toward the side by amount L from directly in front, is viewed, object A appears to be larger than object B. Namely, if the vehicle transverse direction lengths of object A and object B are the same, objects A, B appear at the sizes of apparent angle θ from the eyepoint, respectively. However, this angle θ is an angle that becomes smaller toward the sides, and object B appears to be smaller than object A.

Here, given that the distance from directly in front of the eyepoint P to the side of an object is L, the distance to a virtual screen on which the image of the monitor 22 is projected is d, and the size of the object in the vehicle transverse direction is a, apparent angle θ of the object is expressed by following formula (1).

$$\theta = \arctan((a/d)/(1+L \times (L+a)/d^2)) \quad (1)$$

Figure 7:
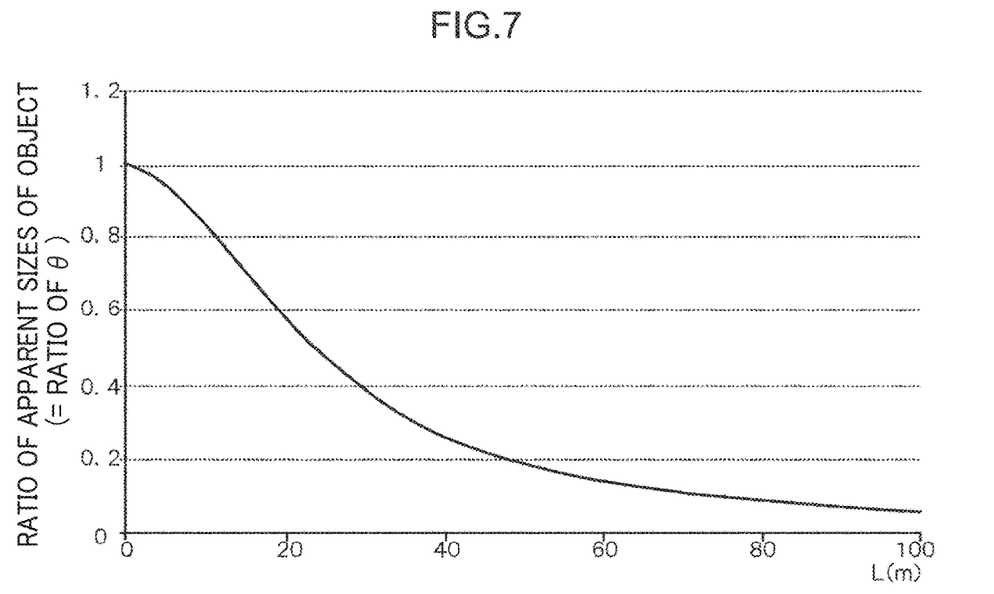
FIG. 7 is a drawing showing a graph in which equation (1) is graphed with a=1 and d=24 m.

The apparent angle θ when an object is viewed from head-on, i.e., when L=0, is the maximum. When L=0 and another condition is satisfied such as θ=3° for example, if the angle which can be displayed on the monitor 22 is moved by 60°, the object is displayed at the center at 1/20 of the width of the monitor 22. As a result of being able to vary the distance L from the front to the side with this condition as is, if the apparent angle is θ=1°, an object that is a point which is apart by the distance L is compressed by 1/3 in the vehicle transverse direction and is displayed at 1/60, as compared with at a time when L=0. Here, results of graphing formula (1) when a=1 and d=24 m are shown in FIG. 7. FIG. 7 shows the proportion of θ when the object is apart by distance L, with θ at the time when L=0 being 1. Note that FIG. 7 illustrates results excluding d to the virtual screen.

Thus, in the present embodiment, in order to carry out display while reflecting the ways of viewing object A and object B at the time of displaying the objects on the monitor 22, the image is displayed while being compressed at a varying compression rate, in accordance with the distance L from the direct front to the side and such that there becomes the ratio of the apparent sizes of the objects that is shown in FIG. 7. Due thereto, an image which is the same as the actual way of viewing can be displayed on the monitor 22, and a sense of incongruity at the time of switching to the half-mirror 23 can be suppressed.

In the concrete flow of processings that are carried out at the control device 30 in the present embodiment, processings that are basically the same as the processings of FIG. 4 of the above-described embodiment are carried out. In detail, in step 112 of the above-described embodiment, at the time of carrying out compression of the image in the vehicle transverse direction, it suffices to carry out compression while varying the compression rate toward the sides such that there becomes the above-described ratio of apparent sizes, and to process the other processings in the same way as in the above-described embodiment.

Note that, with regard to the portions that are compressed at the sides in the first embodiment, the images that are further toward the sides than the rear glass may be compressed at compression rates that accord with the actual ratio of apparent sizes by applying the second embodiment.

Further, in the above-described embodiment, description is given of an example in which the three captured images of the door cameras 16L, 16R and the rear camera 14 are combined, and the vehicle exterior image is generated. However, the vehicle exterior image is not limited to this, and an image that is the combination of the captured images of two cameras may be made to be the vehicle exterior image. Or, the rear camera 14 only may be provided, and the captured image of the rear camera 14 may be made to be the vehicle exterior image.

Further, the above-described embodiment describes an example in which the captured image (a video image) of the inner camera 24 is used as the vehicle cabin image, but the vehicle cabin image is not limited to this. For example, a captured image in which the vehicle cabin interior is imaged in advance at the time when the vehicle is manufactured at or is shipped out from the factory or the like, or a captured image that is captured before traveling of the vehicle starts, may be used. Further, the vehicle cabin image is not limited to an image captured by a camera, and an illustration that depicts the vehicle cabin interior, or the like, may be used. Or, display may be carried out while omitting the vehicle cabin image.

Further, the above-described embodiment describes an example in which, after the three captured images are combined and the vehicle exterior image is generated, the vehicle exterior image is combined with the vehicle cabin image, and thereafter, compression in the vehicle transverse direction is carried out, and the image for display is generated. However, the processes of generating the image for display are not limited to this. For example, for the captured images of the door cameras 16, compression in the vehicle transverse direction of the sides may be carried out, and thereafter, the three captured images may be combined so as to generate the vehicle exterior image, and the vehicle exterior image and the vehicle cabin image may be combined so as to generate the image for display. Or, the three captured images may be combined so as to generate the vehicle exterior image, and the sides of the vehicle exterior image may be compressed, and thereafter, that image may be combined with the vehicle cabin image so as to generate the image for display.

Further, the processings that are carried out by the control device 30 in the above-described embodiments are described as software processings, but are not limited to this. For example, these processings may be processings that are carried out by hardware, or may be processings that combine both hardware and software.

Further, the processings that are carried out by the control device 30 in the above-described embodiments may be stored as a program on a storage medium and distributed.

Moreover, the present invention is not limited to the above, and can of course be implemented by being modified in various ways other than the above within a scope that does not depart from the gist thereof.

The disclosure of Japanese Patent Application No. 2018-027763 filed on Feb. 20, 2018 is, in its entirety, incorporated by reference into the present specification.

The invention claimed is:

1. A viewing device for a vehicle, comprising:
a display portion that displays a captured image of a vehicle rear side; and
a control section that carries out display control that compresses the captured image such that a compression rate in a vehicle transverse direction gradually increases from a vehicle inner side toward vehicle outer sides, and displays an image on the display portion,
wherein, within a range including respective end portions in the vehicle transverse direction of an image for display, the compression rate is established as a ratio between:
an apparent size of a first object in the vehicle transverse direction in a case in which the first object, which is present at a rear side of the vehicle, is viewed from an eyepoint; and
an apparent size of a second object in the vehicle transverse direction in a case in which the second object, which is present at an outer side of the first object in the vehicle transverse direction and has the same actual size as the first object, is viewed from the eyepoint.

2. A viewing device for a vehicle, comprising:
a display portion that displays a captured image of a vehicle rear side; and
a control section that carries out display control that compresses, in a vehicle transverse direction, regions that are further toward sides than a region corresponding to a rear glass in the captured image, and displays an image on the display portion, whererin:
the display control compresses the regions at the sides that are compressed, such that a compression rate gradually increases from a vehicle inner side toward vehicle outer sides, and
within a range including the respective end portions in the vehicle transverse direction of an image for display, the compression rate is established as a ratio between:
an apparent size of a first object in the vehicle transverse direction in a case in which the first object, which is present at a rear side of the vehicle, is viewed from an eyepoint; and
an apparent size of a second object in the vehicle transverse direction in a case in which the second object, which is present at an outer side of the first object in
the vehicle transverse direction and has a same actual size as the first object, is viewed from the eyepoint.

3. The viewing device for a vehicle of claim 2, wherein the regions at the sides which are compressed are regions that are further toward the sides than rear pillars that are adjacent to the rear glass.

4. A viewing device for a vehicle, comprising:
a display portion that displays a captured image of a vehicle rear side; and
a control section that carries out display control that compresses the captured image such that a compression rate in a vehicle transverse direction gradually increases from a vehicle inner side toward vehicle outer sides, and displays an image on the display portion,
wherein, given that a distance from a front of an eyepoint to a side of an object in the captured image is L, a distance to a virtual screen that is used at a time of generating a captured image to be displayed on the display portion is d, and a size of the object in the vehicle transverse direction is a, the display control carries out compression such that an apparent angle .theta. of the object satisfies the formula $\theta = \arc\tan((a/d)/(1+L\times(L+a)/d2))$, and displays the captured image on the display portion.

5. A viewing device for a vehicle, comprising:
a display portion that displays a captured image of a vehicle rear side; and
a control section that carries out display control that compresses the captured image such that a compression rate in a vehicle transverse direction gradually increases from a vehicle inner side toward vehicle outer sides, and displays an image on the display portion,
wherein the compression rate at every point along a transverse direction of the vehicle is established as a ratio between:
an apparent size of a first object in the vehicle transverse direction in a case in which the first object, which is present at a rear side of the vehicle, is viewed from an eyepoint; and
an apparent size of a second object in the vehicle transverse direction in a case in which the second object, which is present at an outer side of the first object in the vehicle transverse direction and has the same actual size as the first object, is viewed from the eyepoint.

* * * * *